(12) United States Patent
Matsumoto et al.

(10) Patent No.: US 9,447,267 B2
(45) Date of Patent: Sep. 20, 2016

(54) MODIFIED POLYPROPYLENE COMPOSITION AND LAMINATE USING THE SAME

(75) Inventors: Hironori Matsumoto, Funabashi (JP); Hirotaka Uosaki, Selangor (MY); Koji Kitahara, Ichihara (JP); Yuji Sawada, Sodegaura (JP)

(73) Assignee: MITSUI CHEMICALS, INC., Tokyo (JP)

( * ) Notice: Subject to any disclaimer, the term of this patent is extended or adjusted under 35 U.S.C. 154(b) by 601 days.

(21) Appl. No.: 13/992,566

(22) PCT Filed: Dec. 7, 2011

(86) PCT No.: PCT/JP2011/078276
§ 371 (c)(1),
(2), (4) Date: Jun. 7, 2013

(87) PCT Pub. No.: WO2012/077706
PCT Pub. Date: Jun. 14, 2012

(65) Prior Publication Data
US 2013/0273386 A1    Oct. 17, 2013

(30) Foreign Application Priority Data
Dec. 9, 2010    (JP) ................. 2010-274702

(51) Int. Cl.
*B32B 27/32* (2006.01)
*C08L 23/12* (2006.01)
*B32B 27/08* (2006.01)
*C08L 23/10* (2006.01)
*C08L 23/14* (2006.01)
*C08L 23/08* (2006.01)

(52) U.S. Cl.
CPC .............. *C08L 23/12* (2013.01); *B32B 27/08* (2013.01); *B32B 27/32* (2013.01); *B32B 27/327* (2013.01); *C08L 23/10* (2013.01); *C08L 23/14* (2013.01); *B32B 2250/246* (2013.01); *B32B 2307/7244* (2013.01); *B32B 2439/70* (2013.01); *C08L 23/0815* (2013.01); *C08L 2205/02* (2013.01); *Y10T 428/3192* (2015.04); *Y10T 428/31938* (2015.04)

(58) Field of Classification Search
None
See application file for complete search history.

(56) References Cited

U.S. PATENT DOCUMENTS

| | | | |
|---|---|---|---|
| 6,455,170 B1 * | 9/2002 | Yasui ................... | B32B 27/32 428/500 |
| 6,770,723 B2 | 8/2004 | Fujita et al. | |
| 6,875,718 B2 | 4/2005 | Fujita et al. | |
| 6,939,928 B1 | 9/2005 | Kawai et al. | |
| 7,300,903 B2 | 11/2007 | Fujita et al. | |
| 7,449,533 B2 | 11/2008 | Kawai et al. | |
| 7,510,775 B2 * | 3/2009 | Pradel ................... | C09J 123/10 428/461 |
| 8,106,122 B2 | 1/2012 | Mochizuki et al. | |
| 2002/0041972 A1 | 4/2002 | Nakamura et al. | |
| 2009/0275700 A1 | 11/2009 | Mochizuki et al. | |
| 2010/0063198 A1 | 3/2010 | Yasui et al. | |

FOREIGN PATENT DOCUMENTS

| | | |
|---|---|---|
| EP | 1 867 692 A1 | 12/2007 |
| JP | 04-300933 | 10/1992 |
| JP | 04-300936 A | 10/1992 |
| JP | 11-315109 | 11/1999 |
| JP | 2000-143903 | 5/2000 |
| JP | 2001-088249 | 4/2001 |
| JP | 2002-088203 | 3/2002 |
| JP | 2002-088204 | 3/2002 |
| JP | 2002-088205 | 3/2002 |
| WO | WO-01/27124 A1 | 4/2001 |
| WO | WO-2008/093805 A1 | 8/2008 |

OTHER PUBLICATIONS

H.N. Cheng, "$^{13}$C NMR Characterization of Ethylene/1-Butene Copolymers", Macromolecules 1991, pp. 4813-4819, vol. 24.
International Search Report dated Feb. 28, 2012, PCT/JP2011/078276.
M. De Pooter, et al., "Determination of the Composition of Common Linear Low Density Polyethylene Copolymers $^{13}$C-NMR Spectroscopy", J. Appl. Polym. Sci., 1991, pp. 399-408, vol. 42.
Masahiro Kakugo, et al., "$^{13}$C NMR Determination of Monomer Sequence Distribution in Ethylene-Propylene Copolymers Prepared with $\delta$-TiCl$_3$-Al(C$_2$H$_5$)$_2$Cl", Macromolecules 1982, pp. 1150-1152, vol. 15.
Extended European Search Report dated Jun. 10, 2014 issued in Application No. 11846433.8.

* cited by examiner

*Primary Examiner* — Monique Jackson
(74) *Attorney, Agent, or Firm* — Foley & Lardner LLP

(57) ABSTRACT

It is an object of the present invention to provide a modified polypropylene composition for forming laminates, which enables prevention of lowering of interlaminar bond strength even in the case where it is subjected to high-speed molding or subjected to stretch molding, and a laminate using the composition and having excellent interlaminar bond properties. The present invention relates to a modified polypropylene composition comprising a propylene-based polymer (A-1), 0 to 45% by weight of a propylene-based polymer (A-2), an ethylene/α-olefin copolymer (B) having a melt flow rate (MFR; ASTM D1238, 230° C., load of 2.16 kg) of 0.01 to 40 g/10 min and a density (ASTM D1505) of not more than 0.900 g/cm$^3$, and a specific amount of modified polypropylene (C) a part or all of which has been graft-modified with an unsaturated carboxylic acid or a derivative thereof.

12 Claims, No Drawings

MODIFIED POLYPROPYLENE COMPOSITION AND LAMINATE USING THE SAME

TECHNICAL FIELD

The present invention relates to a modified polypropylene composition and a laminate (laminated structure) using the composition. More particularly, the present invention relates to a modified polypropylene composition for forming laminates, which has excellent film producing properties and enables prevention of lowering of interlaminar bond strength even in the case where a laminate thereof is produced at a high speed or is subjected to stretch molding, and a laminate using the composition and having excellent interlaminar bond properties.

BACKGROUND ART

Polypropylene resins are excellent in mechanical strength, rigidity, heat resistance, chemical resistance, oil resistance, transparency, low-temperature impact resistance, etc., and utilizing these properties, they have been widely used for packaging materials or covering materials, such as films, sheets and bottles, or decorative materials such as wall paper. Such polypropylene resins, however, have high permeability to gases such as oxygen, and therefore, they could not be used for packaging materials required to have high gas barrier properties, such as those for foods, pharmaceuticals, cosmetics, etc.

Accordingly, in order to enhance gas barrier properties of polypropylene resins, there has been proposed a method of laminating a resin having more excellent gas barrier properties than these resins, such as polyamide or an ethylene/vinyl acetate copolymer saponification product, onto a polypropylene resin. In this case, the bond strength between the polypropylene resin and polyamide (sometimes referred to as "PA" hereinafter) or an olefin/vinyl acetate copolymer saponification product (sometimes referred to as "EVOH" hereinafter) is markedly low, and therefore, it has been proposed that various bonding resins, such as an ionomer, an ethylene/vinyl acetate copolymer and graft-modified products of carboxylic acids, are co-extruded to produce a multilayer structure (patent literature 1).

In recent years, increase in size of productive facilities and speeding up have been further promoted, and materials having more excellent molding processability than before have been required. However, when the molding rate is increased or the laminate is subjected to stretch molding, there sometimes occur problems that the bond strength between PA or EVOH and a bonding resin is weakened, and EVOH and the bonding resin are liable to be peeled from each other, resulting in lowering of barrier properties and deterioration of appearance.

Accordingly, there has been desired development of a modified polypropylene composition for forming laminates, which enables prevention of lowering of interlaminar bond strength even in the case where a laminate thereof is produced at a high speed or a laminate thereof is subjected to stretch molding, and a laminate using the composition and having excellent interlaminar bond properties.

CITATION LIST

Patent Literature

Patent literature 1: Japanese Patent Laid-Open Publication No. 2001-88249

SUMMARY OF INVENTION

Technical Problem

It is an object of the present invention to provide a modified polypropylene composition for faulting laminates, which enables prevention of lowering of interlaminar bond strength even in the case where high-speed molding or stretch molding is carried out in the modified polypropylene composition and a laminate using the composition, and a laminate using the composition and having excellent interlaminar bond properties.

Solution to Problem

As a result of earnest studies by the present inventors, they have found that a modified polypropylene composition having specific formulation enhances interlaminar bond strength in a laminate and enables high-speed molding and stretch molding, and they have accomplished the present invention.

That is to say, the present invention is as follows.

<1> A modified polypropylene composition comprising 60 to 85% by weight of a propylene-based polymer (A-1), 10 to 30% by weight of an ethylene/α-olefin copolymer (B) having a melt flow rate (MFR; ASTM D1238, 230° C., load of 2.16 kg) of 0.01 to 40 g/10 min and a density (ASTM D1505) of not more than 0.900 g/cm$^3$, and 0.01 to 10% by weight of modified polypropylene (C) a part or all of which has been graft-modified with an unsaturated carboxylic acid or a derivative thereof [(A-1)+(B)+(C)=100% by weight], wherein the propylene-based polymer (A-1) has the following properties:

[1] MFR (230° C., load of 2.16 kg) is 1 to 50 (g/10 min),

[2] the elution peak temperature based on TREF is not higher than 75° C., and the elution integrated value at 20° C. is less than 0.1% by weight, and

[3] the melting point, as determined by DSC, is not higher than 135° C.

The present invention is preferably any one of the following compositions.

<2> A modified polypropylene composition comprising 25 to 85% by weight of a propylene-based polymer (A-1), 0 to 45% by weight of a propylene-based polymer (A-2), 10 to 30% by weight of an ethylene/α-olefin copolymer (B) having a melt flow rate (MFR; ASTM D1238, 230° C., load of 2.16 kg) of 0.01 to 40 g/10 min and a density (ASTM D1505) of not more than 0.900 g/cm$^3$, and 0.01 to 10% by weight of modified polypropylene (C) a part or all of which has been graft-modified with an unsaturated carboxylic acid or a derivative thereof [(A-1)+(A-2)+(B)+(C)=100% by weight], wherein the propylene-based polymer (A-1) has the following properties:

[1] MFR (230° C., load of 2.16 kg) is 1 to 50 (g/10 min),

[2] the elution peak temperature based on TREF is not higher than 75° C., and the elution integrated value at 20° C. is less than 0.1% by weight, and

[3] the melting point, as determined by DSC, is not higher than 135° C., and the propylene-based polymer (A-2) has an elution peak temperature based on TREF of higher than 75° C.

<3> The modified polypropylene composition as stated above, wherein the propylene-based polymer (A-1) is a (co)polymer obtained by homopolymerizing propylene or copolymerizing propylene and an α-olefin of 2 to 20 carbon atoms other than propylene in the presence of a metallocene catalyst.

<4> The modified polypropylene composition as stated above, wherein the melt flow rate (MRF; ASTM D1238, 230° C., load of 2.16 kg) of the propylene-based polymer (A-1) is 2 to 6 g/10 min.

<5> A laminate comprising a 2-layer or 3-layer structure consisting of a composition layer composed of the modified polypropylene composition as stated above and a resin layer or resin layers provided on one surface or both surfaces of the composition layer.

<6> The laminate as stated above, wherein the resin layer contains a layer composed of a polymer containing at least a monomer having a polar group.

Further, the present invention is as follows.

<7> A modified polypropylene composition comprising 60 to 85% by weight of a propylene-based polymer (A'-1), 10 to 30% by weight of an ethylene/α-olefin copolymer (B) having a melt flow rate (MFR; ASTM D1238, 230° C., load of 2.16 kg) of 0.01 to 40 g/10 min and a density (ASTM D1505) of not more than 0.900 g/cm$^3$, and 0.01 to 10% by weight of modified polypropylene (C) a part or all of which has been graft-modified with an unsaturated carboxylic acid or a derivative thereof [(A'-1)+(B)+(C)=100% by weight], wherein the propylene-based polymer (A'-1) has the following properties:

[1] MFR (230° C., load of 2.16 kg) is 1 to 50 (g/10 min),
[2'] the elution peak temperature based on TREF is not higher than 75° C., and
[3] the melting point, as determined by DSC, is not higher than 135° C.

The present invention is preferably as follows.

<8> A laminate comprising a layer (Z) composed of an ethylene/vinyl alcohol copolymer, a layer (Y) composed of any one of the modified polypropylene compositions as stated above and a layer (X) composed of unmodified polypropylene, said layers being laminated in this order.

Advantageous Effects of Invention

The modified polypropylene composition of the present invention comprising a propylene-based polymer (A-1), an ethylene/α-olefin copolymer (B) having a melt flow rate (MFR; ASTM D1238, 230° C., load of 2.16 kg) of 0.01 to 10 g/10 min and a density (ASTM D1505) of not more than 0.900 g/cm$^3$ and modified polypropylene (C) a part or all of which has been graft-modified with an unsaturated carboxylic acid or a derivative thereof can enhance interlaminar bond strength in a laminate and enables high-speed molding and stretch molding.

The modified polypropylene composition of the present invention comprising a propylene-based polymer (A'-1), an ethylene/α-olefin copolymer (B) having a melt flow rate (MFR; ASTM D1238, 230° C., load of 2.16 kg) of 0.01 to 10 g/10 min and a density (ASTM D1505) of not more than 0.900 g/cm$^3$ and modified polypropylene (C) a part or all of which has been graft-modified with an unsaturated carboxylic acid or a derivative thereof can enhance interlaminar bond strength in a laminate and enables high-speed molding and stretch molding.

When this modified polypropylene composition is used to produce a laminate of this composition, a resin having excellent gas barrier properties, a modified propylene homopolymer and the like, a laminate having excellent gas barrier properties can be obtained, and the laminate can be preferably used for foods, pharmaceuticals, cosmetics, etc.

DESCRIPTION OF EMBODIMENTS

The present invention is described in more detail hereinafter.

Propylene-Based Polymers (A-1) and (A'-1)

The propylene-based polymer (A-1) that is one of the components to constitute the modified polypropylene composition of the present invention has properties: [1] MFR is 1 to 50 g/10 min, [2] the elution peak temperature based on TREF is not higher than 75° C., and the elution integrated value at 20° C. is not more than 0.1 by weight, and [3] the melting point, as determined by DSC, is not higher than 135° C.

The propylene-based polymer (A'-1) that is one of the components to constitute the modified polypropylene composition of the present invention has properties: [1] MFR is 1 to 50 g/10 min, [2'] the elution peak temperature based on TREF is not higher than 75° C., and [3] the melting point, as determined by DSC, is not higher than 135° C.

MFR of the propylene-based polymers (A-1) and (A'-1) related to the present invention is in the range of 1 to 50 g/10 min, preferably 1 to 10 g/10 min, more preferably 2 to 6 g/10 min. MFR of less than 1 g/10 min is undesirable because extrusion properties are bad and molding is difficult. MFR of more than 50 g/10 min is undesirable because melt tension becomes too low and film production is difficult.

The amounts of the propylene-based polymers (A-1) and (A'-1) related to the present invention are each preferably 25 to 85% by weight, more preferably 30 to 80% by weight, still more preferably 35 to 70% by weight, based on 100% by weight of the modified polypropylene composition. When the content of the propylene-based polymer (A-1) is in the above range, a laminate or the like produced by the use of the modified polypropylene composition has particularly excellent interlaminar bond strength in the high-speed molding and the stretch molding, so that such a content is preferable.

The propylene-based polymer (A-1) related to the present invention has properties: [2] the elution peak temperature based on TREF is not higher than 75° C., and the elution integrated value at 20° C. is less than 0.1% by weight. If a propylene-based polymer having an elution peak temperature based on TREF of higher than 75° C. and having an elution integrated value at 20° C. of not less than 0.1% by weight is used, there is a fear that interlaminar bond strength in the high-speed molding and the stretch molding is lowered.

The propylene-based polymer (A'-1) related to the present invention has properties: [2'] the elution peak temperature based on TREF is not higher than 75° C. When a propylene-based polymer having an elution peak temperature based on TREF of not higher than 75° C. is used, interlaminar bond strength in the high-speed molding and the stretch molding is particularly excellent, so that such a polymer is preferable.

The propylene-based polymers (A-1) and (A'-1) related to the present invention have a melting point (Tm), as determined by DSC, of not higher than 135° C., preferably not higher than 120° C. If a propylene-based polymer having a melting point of higher than 135° C. is used, there is a fear that interlaminar bond strength in the high-speed molding and the stretch molding is lowered.

The propylene-based polymer (A-1) related to the present invention, which has the above properties [2], or the propylene-based polymer (A'-1) related to the present invention, which has the above properties [2'], is preferably obtained by homopolymerizing propylene or copolymerizing propylene and an α-olefin of 2 to 20 carbon atoms other than propylene in the presence of a metallocene catalyst.

As the metallocene catalyst for use in the present invention, there can be mentioned a metallocene catalyst which comprises a metallocene compound, at least one compound selected from an organometallic compound, an organoaluminum oxy compound and a compound capable of forming an ion pair by the reaction with the metallocene compound, and if necessary, a particulate carrier and which can preferably perform stereoregular polymerization for forming an isotactic or syndiotactic structure or the like. Of such metallocene compounds, a crosslinkable metallocene compound described in Published Patent Application WO01/27124 is preferably used.

[Chem. 1]

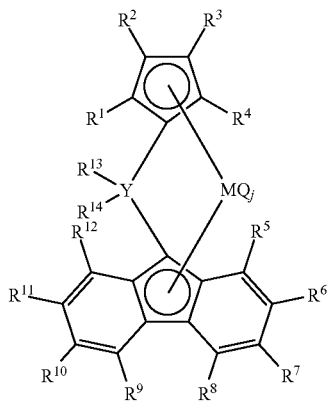

[I]

In the above general formula [I], $R^1$, $R^2$, $R^3$, $R^4$, $R^5$, $R^6$, $R^7$, $R^8$, $R^9$, $R^{10}$, $R^{11}$, $R^{12}$, $R^{13}$ and $R^{14}$ are each selected from hydrogen, a hydrocarbon group and a silicon-containing group, and they may be the same or different. Examples of such hydrocarbon groups include straight-chain hydrocarbon groups, such as methyl group, ethyl group, n-propyl group, allyl group, n-butyl group, n-pentyl group, n-hexyl group, n-heptyl group, n-octyl group, n-nonyl group and n-decanyl group; branched hydrocarbon groups, such as isopropyl group, tert-butyl group, amyl group, 3-methylpentyl group, 1,1-diethylpropyl group, 1,1-dimethylbutyl group, 1-methyl-1-propylbutyl group, 1,1-propylbutyl group, 1,1-dimethyl-2-methylpropyl group and 1-methyl-1-isopropyl-2-methylpropyl group; cyclic saturated hydrocarbon groups, such as cyclopentyl group, cyclohexyl group, cycloheptyl group, cyclooctyl group, norbornyl group and adamantly group; cyclic unsaturated groups, such as phenyl group, tolyl group, naphthyl group, biphenyl group, phenanthryl group and anthracenyl group; saturated hydrocarbon groups substituted by cyclic unsaturated hydrocarbon groups, such as benzyl group, cumyl group, 1,1-diphenylethyl group and triphenylmethyl group; and hetero atom-containing hydrocarbon groups, such as methoxy group, ethoxy group, phenoxy group, furyl group, N-methylamino group, N,N-dimethylamino group, N-phenylamino group, pyrryl group and thienyl group. Examples of the silicon-containing groups include trimethylsilyl group, triethylsilyl group, dimethylphenylsilyl group, diphenylmethylsilyl group and triphenylsilyl group. Adjacent substituents of $R^5$ to $R^{12}$ may be bonded to each other to form a ring. Examples of such substituted fluorenyl groups include benzofluorenyl group, dibenzofluorenyl group, octahydrodibenzofluorenyl group, octamethyloctahydrodibenzofluorenyl group and octamethyltetrahydrodicyclopentafluorenyl group.

In the general formula [I], $R^1$, $R^2$, $R^3$ and $R^4$ by which the cyclopentadienyl ring is substituted are each preferably hydrogen or a hydrocarbon group of 1 to 20 carbon atoms. Examples of the hydrocarbon groups of 1 to 20 carbon atoms include the aforesaid hydrocarbon groups. $R^3$ is more preferably a hydrocarbon group of 1 to 20 carbon atoms.

In the general formula [I], $R^5$ to $R^{12}$ by which the fluorene ring is substituted are each preferably a hydrocarbon group of 1 to 20 carbon atoms. Examples of the hydrocarbon groups of 1 to 20 carbon atoms include the aforesaid hydrocarbon groups. Adjacent substituents of $R^5$ to $R^{12}$ may be bonded to each other to form a ring.

In the general formula [I], Y that crosslinks the cyclopentadienyl ring and the fluorenyl ring to each other is preferably a Group 14 element, more preferably carbon, silicon or germanium, still more preferably a carbon atom. $R^{13}$ and $R^{14}$ by which this Y is substituted are each preferably a hydrocarbon group of 1 to 20 carbon atoms. These may be the same as or different from each other, and may be bonded to each other to form a ring. Examples of the hydrocarbon groups of 1 to 20 carbon atoms include the aforesaid hydrocarbon groups. $R^{14}$ is more preferably an aryl group of 6 to 20 carbon atoms. Examples of the aryl groups include the aforesaid cyclic unsaturated hydrocarbon groups, saturated hydrocarbon groups substituted by cyclic unsaturated hydrocarbon groups and hetero atom-containing cyclic unsaturated hydrocarbon groups. $R^{13}$ and $R^{14}$ may be the same as or different from each other, and may be bonded to each other to form a ring. Examples of such substituents include fluorenylidene group, 10-hydroanthracenylidene group and dibenzocycloheptadienylidene group.

In the general formula [I], M is preferably a Group 4 transition metal, more preferably Ti, Zr, Hf or the like. Each Q is selected from a halogen, a hydrocarbon group, an anionic ligand and a neutral ligand capable of coordination by a lone pair of electrons, and is the same or different. j is an integer of 1 to 4, and when j is 2 or greater, plural Q may be same as or different from each other. Examples of halogens include fluorine, chlorine, bromine and iodine, and examples of the hydrocarbon groups include the same groups as previously described. Examples of the anionic ligands include alkoxy groups, such as methoxy, tert-butoxy and phenoxy, carboxylate groups, such as acetate and benzoate, and sulfonate groups, such as mesylate and tosylate. Examples of the neutral ligands capable of coordination by a lone pair of electrons include organophosphorus compounds, such as trimethylphosphine, triethylphosphine, triphenylphosphine and diphenylmethylphosphine, and ethers, such as tetrahydrofuran, diethyl ether, dioxane and 1,2-dimethoxyethane. At least one of Q is preferably a halogen or an alkyl group.

As such a crosslinkable metallocene compound, isopropylidene(3-tert butyl-5-methyl-cyclopentadienyl) (fluorenyl) zirconium dichloride, isopropylidene(3-tert-butyl-5-methyl-cyclopentadienyl)(3, 6-di-tert-butylfluorenyl)zirconium dichloride, diphenylmethylene(3-tert-butyl-5-methyl-cyclopentadienyl) (fluorenyl)zirconium dichloride, diphenylmethylene(3-tert-butyl-5-methyl-cyclopentadienyl) (2,7-di-tert-butylfluorenyl)zirconium dichloride, or diphenylmethylene(3-tert-butyl-5-methyl-cyclopentadienyl) (3,6-di-tert-butylfluorenyl)zirconium dichloride is preferably used.

As for the above-mentioned at least one compound selected from an organometallic compound, an organoaluminum oxy compound and a compound which reacts with the transition metal compound (A) to form an ion pair and the particulate carrier used when needed, which are used together with the Group 4 transition metal compound represented by the general formula [I] in the metallocene catalyst related to the present invention, compounds disclosed in the aforesaid publication (WO01/27124) and Japanese Patent Laid-Open Publication No. 1999-315109 can be used without any restriction.

Preferred examples of the α-olefins used together with propylene in the copolymerization in the present invention include ethylene, 1-butene, 1-pentene, 4-methyl-1-pentene and 1-octene. These can be also used in combination of plural kinds at the same time. Of these, ethylene and 1-butene are preferably used.

In the present invention, additives, such as antioxidant, heat stabilizer, weathering stabilizer, slip agent, anti-blocking agent and crystal nucleating agent, may be contained when needed, within limits not detrimental to the properties of the propylene-based polymers (A-1) and (A'-1).

It is also possible that after blending the above components and if necessary various additives by a mixing machine, such as Henschel mixer, Banbury mixer or tumbler mixer, pellets are prepared from the resulting blend by the use of a single-screw or twin-screw extruder, and the pellets are used for the later-described film production. However, it is also possible to feed the blend of the components to a film producing machine.

Propylene-Based Polymer (A-2)

The propylene-based polymer (A-2) which may be contained in the modified polypropylene composition of the present invention is a homopolymer of propylene or a copolymer of propylene and a small amount of an α-olefin, and is usually a polymer which is manufactured and sold as polypropylene. The propylene-based polymer (A-2) may be a polymer used singly or may be a mixture of some different propylene-based polymers.

As the propylene-based polymer (A-2) related to the present invention, any propylene-based polymer may be used as far as it is different from the propylene-based polymers (A-1) and (A'-1). However, the propylene-based polymer (A-2) is preferably a propylene-based polymer having an elution peak temperature based on TREF of higher than 75° C.

The process for preparing the propylene-based polymer (A-2) related to the present invention is not specifically restricted, and the propylene-based polymer (A-2) can be prepared by a well-known process using a well-known catalyst such as Ziegler-Natta catalyst or metallocene-based catalyst. Further, a crystalline polymer can be preferably used, and in the case of a copolymer, the copolymer may be a random copolymer or may be a block copolymer. Moreover, there is no specific limitation on the stereoregularity and the molecular weight as far as the polymer used satisfies moldability and has strength enough to withstand use as a molded product. It is also possible to utilize a commercially available resin as such. The propylene homopolymer and the propylene/α-olefin random copolymer can be prepared by hitherto publicly known processes using a vanadium-based catalyst, a titanium-based catalyst, a metallocene-based catalyst or the like.

The amount of the propylene-based polymer (A-2) related to the present invention is preferably 0 to 45% by weight, more preferably 0 to 35% by weight, still more preferably 0 to 20% by weight, based on 100% by weight of the modified polypropylene composition. An amount exceeding 45% by weight is undesirable because interlaminar bond strength in the high-speed molding and the stretch molding is lowered.

Ethylene/α-Olefin Copolymer (B)

The ethylene/α-olefin copolymer (B) that is one of the components to constitute the modified polypropylene composition of the present invention has a melt flow rate (MFR; ASTM D1238, 230° C., load of 2.16 kg) of 0.01 to 40 g/10 min, preferably 0.01 to 20 g/10 min, more preferably 0.1 to 10 g/10 min, and a density (ASTM D1505) of not more than 0.900 g/cm$^3$, preferably 0.850 to 0.900 g/cm$^3$, more preferably 0.860 to 0.890 g/cm$^3$.

The ethylene/α-olefin copolymer (B) having such properties is usually a non-crystalline one or a low-crystalline one having a crystallinity, as measured by X-ray diffractometry, of less than 40%.

The ethylene/α-olefin copolymer (B) related to the present invention is a random copolymer obtained by copolymerizing ethylene and an α-olefin, preferably an α-olefin of 3 to 20 carbon atoms.

Examples of the α-olefins of 3 to 20 carbon atoms to be copolymerized with ethylene include propylene, 1-butene, 1-pentene, 1-hexene, 1-heptene, 1-octene, 1-nonene, 1-decene, 1-undecene, 1-dodecene, 1-tetradecene, 1-hexadecene, 1-octadecne, 1-nonadecene, 1-eicosene and 4-methyl-1-pentene. Of these, an α-olefin of 3 or 4 carbon atoms is preferable. These α-olefins are used singly or in combination of two or more kinds.

In the ethylene/α-olefin copolymer (B) related to the present invention, the amount of constituent units derived from ethylene is not specifically restricted as far as the density is in the above range. However, the ethylene/α-olefin copolymer (B) contains constituent units derived from ethylene preferably in an amount of 55 to 95% by weight, more preferably 60 to 90% by weight, and contains constituent units derived from the α-olefin of 3 to 20 carbon atoms preferably in an amount of 5 to 45% by weight, more preferably 10 to 40% by weight.

Examples of the ethylene/α-olefin copolymers (B) related to the present invention include an ethylene/propylene random copolymer, an ethylene/1-butene random copolymer, an ethylene/propylene/1-butene random copolymer, an ethylene/1-hexene random copolymer, an ethylene/1-butene/1-hexene random copolymer and an ethylene/1-octene random copolymer. Of these, an ethylene/propylene random copolymer is preferable. These copolymers may be used in combination of two or more kinds.

Such an ethylene/α-olefin copolymer (B) as above can be prepared by a hitherto publicly known process using a vanadium-based catalyst, a titanium-based catalyst, a metallocene-based catalyst or the like.

The ethylene/α-olefin copolymer (B) related to the present invention is used preferably in an amount of 10 to 30% by weight, more preferably 12 to 30% by weight, still more preferably 15 to 30% by weight, based on 100% by weight of the total amount of the propylene-based polymer (A-1), the propylene polymer (A-2), the ethylene/α-olefin copolymer (B) and the modified polypropylene (C).

When the ethylene/α-olefin copolymer (B) is used in the above amount, a modified polypropylene composition for forming laminates, which provides laminates having excellent interlaminar bond strength, can be obtained.

Modified Polypropylene (C)

The modified polypropylene (C) that is one of the components to constitute the modified polypropylene composition of the present invention is polypropylene having been graft-modified with an unsaturated carboxylic acid and/or a derivative thereof.

The polypropylene used for the graft modification is a homopolymer of propylene and/or a propylene/α-olefin copolymer. The α-olefin of the propylene/α-olefin copolymer is ethylene and/or an α-olefin of 4 to 20 carbon atoms, and such α-olefins may be used singly or in combination of two or more kinds. Examples of preferred α-olefins in the present invention include α-olefins of 4 to 10 carbon atoms, and of these, α-olefins of 4 to 8 carbon atoms can be preferably used.

The process for preparing polypropylene that is used for the graft modification to obtain the modified polypropylene related to the present invention is not specifically restricted, and the polypropylene can be prepared by a well-known process using a well-known catalyst such as Ziegler-Natta catalyst or metallocene-based catalyst. Further, a crystalline polymer can be preferably used, and in the case of a copolymer, the copolymer may be a random copolymer or may be a block copolymer. Moreover, there is no specific limitation on the stereoregularity and the molecular weight as far as the polymer used satisfies moldability and has strength enough to withstand use as a molded product. It is also possible to utilize a commercially available resin as such.

The melt flow rate (MFR; ASTM D1238, 230° C., load of 2.16 kg) of the modified polypropylene (C) related to the present invention is usually 0.01 to 400 g/10 min, preferably 0.1 to 90 g/10 min. Since the modified polypropylene (C) having a melt flow rate of this range has excellent fluidity, such a modified polypropylene composition as can be molded into a large-sized product and as can be subjected to high-speed molding can be obtained.

Examples of the unsaturated carboxylic acids and/or derivatives thereof that are used as graft monomers include unsaturated compounds having one or more carboxylic acid groups, esters of compounds having a carboxylic acid group and alkyl alcohols, and unsaturated compounds having one or more carboxylic anhydride groups. Examples of unsaturated groups include vinyl group, vinylene group and unsaturated cyclic hydrocarbon groups. Specific examples of the compounds include unsaturated carboxylic acids, such as acrylic acid, maleic acid, fumaric acid, tetrahydrophthalic acid, itaconic acid, citraconic acid, crotonic acid, isocrotonic acid and Nadic acid [trademark] (endocis-bicyclo[2.2.1] hept-5-ene-2,3-dicarboxylic acid); and derivatives thereof, such as acid halides, amides, imides, anhydrides and esters. Specific examples of the derivatives include malenyl chloride, maleimide, maleic anhydride, citraconic anhydride, monomethyl maleate, dimethyl maleate and glycidyl maleate. These unsaturated carboxylic acids and/or derivatives thereof can be used singly or can be used in combination of two or more kinds. Of these, unsaturated dicarboxylic acids and acid anhydrides thereof are preferable, and in particular, maleic acid, Nadic acid or a derivative thereof is preferably used. Control of the content of the unsaturated carboxylic acid and/or the derivative thereof can be easily carried out by, for example, properly selecting the graft conditions.

There is no specific limitation on the method to graft a graft monomer selected from the unsaturated carboxylic acids and/or the derivatives thereof onto the polypropylene, and hitherto publicly known graft polymerization, such as solution method or melt kneading method, can be adopted. For example, there is a method in which polypropylene is melted and a graft monomer is added to the molten polypropylene to perform graft reaction or a method in which polypropylene is dissolved in a solvent to prepare a solution and a graft monomer is added to the solution to perform graft reaction.

When graft polymerization is carried out in the presence of a radical initiator in the above methods, the graft monomer such as the above unsaturated carboxylic acid can be efficiently graft polymerized. In this case, the radical initiator is usually used in an amount of 0.001 to 1 part by weight based on 100 parts by weight of the polypropylene.

As the radical initiator, an organic peroxide, an azo compound or the like is used. Specific examples thereof include benzoyl peroxide, dichlorobenzoyl peroxide, dicumyl peroxide, di-t-butyl peroxide, 2,5-dimethyl-2,5-di (peroxide benzoate)hexyne-3,1,4-bis(t-butylperoxyisopropyl)benzene, lauroyl peroxide, t-butyl peracetate, 2,5-dimethyl-2,5-di(t-butyl peroxide)hexyne-3,2,5-dimethyl-2,5-di (t-butyl peroxide)hexane, t-butyl perbenzoate, t-butyl perphenyl acetate, t-butyl perisobutylate, t-butyl per-sec-octoate, t-butyl perpivalate, cumyl perpivalate, t-butyl perdiethyl acetate, azobisisobutylonitrile and dimethyl azoisobutylate.

Of these, dialkyl peroxides, such as dicumyl peroxide, di-t-butyl peroxide, 2,5-dimethyl-2,5-di(t-butylperoxy) hexyne-3,2,5-dimethyl-2,5-di(t-butylperoxy)hexane and 1,4-bis(t-butylperoxyisopropyl)benzene, are preferably used.

The reaction temperature of the graft polymerization reaction using the radical initiator or the graft polymerization reaction without using the radical initiator is set usually in the range of 60 to 350° C., preferably 150 to 300° C.

The content of the unsaturated carboxylic acid or the derivative thereof in the modified polypropylene (C) related to the present invention is usually 0.1 to 10% by weight, preferably 1 to 10% by weight, more preferably 2 to 9% by weight, based on 100% by weight of the modified polypropylene (C).

Modified Polypropylene Composition

The modified polypropylene composition of the present invention is a modified polypropylene composition comprising 25 to 85% by weight of the propylene-based polymer (A-1), 0 to 45% by weight of the propylene-based polymer (A-2), 10 to 30% by weight of the ethylene/α-olefin copolymer (B) having a melt flow rate (MFR; ASTM D1238, 230° C., load of 2.16 kg) of 0.01 to 40 g/10 min and a density (ASTM D1505) of not more than 0.900 g/cm$^3$, and 0.01 to 10% by weight of the modified polypropylene (C) a part or all of which has been graft-modified with an unsaturated carboxylic acid or a derivative thereof [(A-1)+(A-2)+(B)+ (C)=100% by weight].

In the modified propylene composition of the present invention, the propylene-based polymer (A-2) is an arbitrary component, and when the amount of the propylene-based polymer (A-2) is 0% by weight, the modified polypropylene composition of the present invention is a modified polypropylene composition comprising 60 to 85% by weight of the propylene-based polymer (A-1), 10 to 30% by weight of the ethylene/α-olefin copolymer (B) having a melt flow rate (MFR; ASTM D1238, 230° C., load of 2.16 kg) of 0.01 to 40 g/10 min and a density (ASTM D1505) of not more than 0.900 g/cm$^3$, and 0.01 to 10% by weight of the modified polypropylene (C) a part or all of which has been graft-modified with an unsaturated carboxylic acid or a derivative thereof [(A-1)+(B)+(C)=100% by weight].

Further, the modified polypropylene composition of the present invention is a modified polypropylene composition comprising 60 to 85% by weight of the propylene-based polymer (A'-1), 10 to 30% by weight of the ethylene/α- olefin copolymer (B) having a melt flow rate (MFR; ASTM D1238, 230° C., load of 2.16 kg) of 0.01 to 40 g/10 min and a density (ASTM D1505) of not more than 0.900 g/cm$^3$, and 0.01 to 10% by weight of the modified polypropylene (C) a part or all of which has been graft-modified with an unsaturated carboxylic acid or a derivative thereof [(A'-1)+(B)+(C)=100% by weight] and is preferably a modified polypropylene composition comprising 25 to 85% by weight of the propylene-based polymer (A'-1), 0 to 45% by weight of the propylene-based polymer (A-2), 10 to 30% by weight of the ethylene/α-olefin copolymer (B) having a melt flow rate (MFR; ASTM D1238, 230° C., load of 2.16 kg) of 0.01 to 40 g/10 min and a density (ASTM D1505) of not more than 0.900 g/cm$^3$, and 0.01 to 10% by weight of the modified polypropylene (C) a part or all of which has been graft-modified with an unsaturated carboxylic acid or a derivative thereof [(A'-1)+(A-2)+(B)+(C)=100% by weight].

The melt flow rate (MFR; ASTM D1238, 230° C., load of 2.16 kg) of the modified polypropylene composition of the present invention is desired to be usually in the range of 0.1 to 50 g/10 min, preferably 0.5 to 40 g/10 min, more preferably 1.0 to 25 g/10 min. The density (ASTM D1505) is desired to be usually in the range of 880 to 910 kg/m$^3$, preferably 882 to 908 kg/m$^3$, more preferably 885 to 905 kg/m$^3$.

The modified polypropylene composition of the present invention can be obtained by mixing the components of the propylene-based polymer (A-1), the ethylene/α-olefin copolymer (B), the modified polypropylene (C), and if necessary, the propylene-based polymer (A-2) and then melt kneading the mixture.

Further, the modified polypropylene composition of the present invention can be obtained by mixing the components of the propylene-based polymer (A'-1), the ethylene/α-olefin copolymer (B), the modified polypropylene (C), and if necessary, the propylene-based polymer (A-2) and then melt kneading the mixture.

Although the melt kneading is carried out by the use of a kneading apparatus, such as mixing roll, Banbury mixer, kneader or single-screw or twin-screw extruder, it is preferable to carry out melt kneading in a closed type kneading apparatus. The melt kneading is preferably carried out in an atmosphere of an inert gas such as nitrogen.

The kneading temperature is usually 200 to 310° C., preferably 280 to 300° C., and the kneading time is 1 to 10 minutes, preferably 1 to 2 minutes. During the melt kneading, to the propylene-based polymer (A-1), the ethylene/α-olefin copolymer (B) and the modified polypropylene (C) or to the propylene-based polymer (A'-1), the ethylene/α-olefin copolymer (B) and the modified polypropylene (C), etc., additives usually used for a modified propylene homopolymer, such as phenol-based antioxidant, phosphorus-based antioxidant, sulfur-based antioxidant, metallic compound and metal salt of higher fatty acid, can be added when needed, within limits not detrimental to the object of the present invention.

The modified polypropylene composition of the present invention can be also obtained by mixing the components of the propylene-based polymer (A-1), the ethylene/α-olefin copolymer (B), and if necessary, the propylene/based polymer (A-2) or mixing the components of the propylene-based polymer (A'-1), the ethylene/α-olefin copolymer (B), and if necessary, the propylene-based polymer (A-2) and then carrying out graft modification with an unsaturated carboxylic acid or a derivative thereof.

To the modified polypropylene composition of the present invention, blendable other resins, elastomer, tackifier, filler, etc. can be added within limits not detrimental to the object of the present invention. Addition of other resins, etc. may be carried out simultaneously with melt kneading of the aforesaid components (A-1), (B) and (C), and if necessary, the component (A-2) or simultaneously with melt kneading of the aforesaid components (A'-1), (B) and (C), and if necessary, the component (A-2), or may be carried out after the modified polypropylene composition is once obtained.

Laminate

Although the modified polypropylene composition of the present invention can be used alone, it can be preferably used as a bonding layer in a structure of a laminate constituted of a substrate and the bonding layer laminated thereon.

Although the substrate to constitute the laminate of the present invention is not specifically restricted, a film of a polyolefin-based resin such as polyethylene or polypropylene, a film of a styrene-based resin, a film of polyester that is a polymer containing at least a monomer having a polar group, such as polyethylene terephthalate or polybutylene terephthalate, a film of polyamide such as nylon 6 or nylon 6,6, an ethylene/vinyl alcohol copolymer film or a stretched film thereof, a film comprising resin layers, e.g., a laminate (film) of a modified propylene polymer film and a film having gas barrier properties such as a polyamide film or an ethylene/vinyl alcohol copolymer film, a deposited film in which aluminum, silica or the like is deposited on a film composed of a resin layer, a metal foil such as aluminum, paper, or the like is properly selected and used according to the use purpose of the packaging material. Such substrates can be used singly or in combination of two or more kinds.

Examples of the polyamides to constitute the laminate of the present invention include nylon 6, nylon 66 and MXD nylon (metaxylylenediamine copolymerized nylon).

As the ethylene/vinyl alcohol copolymer to constitute the laminate of the present invention, a copolymer containing polymerized units derived from ethylene in an amount of 20 to 50% by mol, preferably 25 to 48% by mol, is desirable. Such a copolymer can be prepared by saponifying the corresponding ethylene/vinyl acetate copolymer in a conventional way.

The laminate of the present invention is preferably a laminate in which a layer composed of a polymer containing, as a constituent unit, a monomer having a polar group, a layer composed of the modified polypropylene composition of the present invention and a layer composed of a polymer containing, as a constituent unit, a monomer having no polar group are laminated in this order; it is preferably a laminate in which a layer composed of an ethylene/vinyl alcohol copolymer or polyamide, a layer composed of the modified polypropylene composition of the present invention and a layer composed of polyolefin are laminated in this order; and it is particularly preferably a laminate in which a layer composed of an ethylene/vinyl alcohol copolymer, a layer composed of the modified polypropylene composition of the present invention and a layer composed of unmodified polypropylene are laminated in this order.

The laminate of the present invention may be a laminate having a structure of 5 layers of 3 kinds, in which a layer composed of the modified polypropylene composition of the present invention and a layer composed of a polymer containing, as a constituent unit, a monomer having no polar group are laminated in this order on each side of a layer composed of a polymer containing, as a constituent unit, a monomer having a polar group.

The laminate of the present invention can be produced by various publicly known methods. For example, the laminate can be produced by publicly known co-extrusion methods, such as inflation method, casting, tubing method and extrusion coating. Further, a method comprising producing a single-layer or multilayer film or the like and then heating it to perform dry lamination can be given as an example. In the present invention, co-extrusion molding is preferably used.

EXAMPLES

The present invention is further described with reference to the following examples, but it should be construed that the present invention is in no way limited to those examples. Polymers and analytical methods used in the present invention are as follows.

[Polymers]
(1) Propylene-Based Polymers (A-1) and (A'-1)
(i) Preparation of Propylene-Based Polymer (A-1-1)
(1) Preparation of Solid Catalyst Carrier In a 1-liter side-arm flask, 300 g of $SiO_2$ (manufactured by Dohkai Chemical Co., Ltd.) was sampled, and 800 ml of toluene was added to give a slurry. Next, the slurry was transferred into a 5-liter four-neck flask, and 260 ml of toluene was added. Then, 2830 ml of a toluene solution of methylaluminoxane (referred to as "MAO" hereinafter) (10 wt % solution manufactured by Albemarle Corporation) was introduced, followed by stirring for 30 minutes at room temperature. The temperature of the system was raised up to 110° C. over a period of 1 hour, and stirring was carried out at the same temperature for 4 hours. After the stirring was completed, the system was cooled down to room temperature. After the cooling, the supernatant toluene was drawn out, and fresh toluene was substituted. The substitution was carried out until the substitution ratio became 95%.

(2) Preparation of Solid Catalyst Component (Supporting of Metal Catalyst Component on Carrier)

In a glove box, 2.0 g of dimethylsilylenebis(2-methyl-4-phenylindenyl)zirconium dichloride was weighed into a 5-liter four-neck flask. The flask was taken out of the glove box, and 0.46 liter of toluene and 1.4 liters of the MAO/SiO2/toluene slurry prepared above (1) were added in nitrogen, and they were stirred for 30 minutes to carry out supporting. The resulting dimethylsilylenebis(2-methyl-4-phenylindenyl)zirconium dichloride/MAO/SiO2/toluene slurry was subjected to 99% substitution by n-heptane to adjust the final amount of the slurry to 4.5 liters. This operation was carried out at room temperature.

(3) Pre-Prepolymerization [P-1]

In an autoclave having an internal volume of 200 liters and equipped with a stirrer, 202 g of the solid catalyst component prepared in the above section of preparation of solid catalyst, 109 ml of triethylaluminum and 100 liters of n-heptene were placed, then with maintaining the internal temperature at 15 to 20° C., 2020 g of ethylene was introduced, and they were reacted for 180 minutes with stirring. After the polymerization was completed, the solid component was precipitated, and removal of the supernatant liquid and washing with n-heptane were carried out twice. The resulting pre-prepolymerization catalyst was resuspended in purified heptane, and adjustment was carried out using n-heptane so that the solid catalyst component concentration might become 2 g/liter. A part of the resulting slurry was sampled, and analysis of the prepolymer was carried out. This prepolymer contained 10 g of polyethylene based on 1 g of the solid catalyst component.

(4) Prepolymerization [P-2]

To a tubular polymerizer having an internal volume of 58 liters were continuously fed propylene at 57 kg/hr, hydrogen at 4 NL/hr, the catalyst slurry prepared in the pre-prepolymerization as the solid catalyst component at 3.5 g/hr and triethylaluminum at 2.3 ml/hr, and polymerization was carried out in a state where the polymerizer was full of liquid and contained no gas phase. The temperature of the tubular reactor was 30° C., and the pressure was 2.6 MPa·G.

(5) Polymerization [P-3]

The slurry obtained in the above prepolymerization (4) was fed to a vessel polymerizer having an internal volume of 1000 liters and equipped with a stirrer to further carry out polymerization. To the polymerizer were fed propylene at 50 kg/hr and ethylene at 2.0 kg/hr, and hydrogen was fed so that the hydrogen concentration in the gas phase might become 0.15% by mol. The polymerization was carried out at a polymerization temperature of 60° C. and a pressure of 2.5 MPa·G.

The resulting slurry was fed to a vessel polymerizer having an internal volume of 500 liters and equipped with a stirrer to further carry out polymerization. To the polymerizer were fed propylene at 11 kg/hr and ethylene at 1.5 kg/hr, and hydrogen was fed so that the hydrogen concentration in the gas phase might become 0.15% by mol. The polymerization was carried out at a polymerization temperature of 59° C. and a pressure of 2.4 MPa·G.

(6) The Resulting Propylene/Ethylene Random Copolymer was Subjected to Pelletization in Accordance with the Following [a1] Pelletization of the Molding and Processing Method, to Obtain a Propylene-Based Polymer (A-1-1).

The primary property values of the resulting propylene-based polymer (A-1-1) are set forth in Table 1.

(ii) Propylene-Based Polymer (A-1-2)

Preparation process was carried out in the same manner as for the propylene-based polymer (A-1-1), except that the prepolymerization was changed as follows.

(4) Prepolymerization [P-2]

To a tubular polymerizer having an internal volume of 58 liters were continuously fed propylene at 57 kg/hr, hydrogen at 4 NL/hr, the catalyst slurry prepared in the pre-prepolymerization as the solid catalyst component at 4.7 g/hr and triethylaluminum at 3.1 ml/hr, and polymerization was carried out in a state where the polymerizer was full of liquid and contained no gas phase. The temperature of the tubular reactor was 30° C., and the pressure was 2.6 MPa·G.

(6) The Resulting Propylene-Based Copolymer (A-1-2) was Subjected to Pelletization in Accordance with the Following [a1]Pelletization of the Molding and Processing Method, to Obtain a Propylene-Based Polymer (A-1-2).

The primary property values of the resulting propylene-based polymer (A-1-2) are set forth in Table 1.

TABLE 1

| Property items | Unit | Prep. Ex. 1 (A-1-1) | Prep. Ex. 2 (A-1-2) |
| --- | --- | --- | --- |
| MFR | g/10 min | 3 | 2.3 |
| Ethylene concentration Px | mol % | 7.6 | 7.7 |
| Tm | ° C. | 134 | 118 |
| Mn | $\times 10^4$ | 11.8 | 12 |
| Mw/Mn | — | 2.8 | 2.7 |
| Tensile yield strength | MPa | 19 | 19 |
| Tensile elongation at break | % | 530 | 560 |
| Flexural strength | MPa | 21 | 17 |
| Flexural modulus | MPa | 515 | 503 |
| TREF elution peak | ° C. | 70.7 | 70.7 |
| TREF elution integrated value | −(20° C.) | <0.1 | <0.1 |

(2) Propylene-Based Polymer (A-2)

(i) Propylene-Based Polymer (A-2-1)

Random polypropylene manufactured by Prime Polymer Co., Ltd. (trade name: F327), MFR: 7.2 g/10 min, density: 0.900 g/cm$^3$, elution peak temperature based on TREF: 95.2° C., elution integrated value based on TREF at 20° C.: 0.4% by weight (3) Ethylene/α-Olefin Copolymer (B)

(i) Ethylene/Propylene Copolymer (B-1)

Ethylene/propylene random copolymer manufactured by Mitsui Chemicals, Inc. (trade name: TAFMER P-0680) MFR: 7.0 g/10 min, density: 0.870 g/cm$^3$ (4) Modified Polypropylene (C)

(i) Modified Propylene Homopolymer (C-1)

Using toluene as a reaction solvent, 825 g of a propylene homopolymer was dissolved based on 5.7 liters of toluene at 160° C. Next, to this toluene solution, a toluene solution of maleic anhydride (4.13 g/250 ml) and a toluene solution of dicumyl peroxide (DPC) (0.33 g/50 ml) were slowly fed through separate conduit pipes over a period of 4 hours.

After the feeding was completed, the reaction was further continued at 160° C. for 30 minutes, and then the temperature was lowered down to room temperature to precipitate a polymer. The polymer precipitated was filtered, then washed with acetone repeatedly and dried at 80° C. for one day and night under reduced pressure to obtain a desired modified propylene homopolymer (C-1). This modified propylene homopolymer was subjected to elemental analysis to measure the graft quantity of maleic anhydride. As a result, it was found that maleic anhydride had been graft polymerized in an amount of 2.0 g based on 100 g of the modified propylene homopolymer.

(5) Propylene-Based Polymer (E)

(i) Propylene-Based Polymer (E-1)

Metallocene-generated polypropylene manufactured by Japan Polypropylene Corporation (trade name: WINTEC WFX4TA), MFR: 7.0 g/10 min, density: 0.900 g/cm$^3$, elution peak temperature based on TREF: 80.4° C., elution integrated value based on TREF at 20° C.: less than 0.1% by weight

[Analytical Methods]

[m1] Ethylene Concentration Px in Propylene-Based Random Copolymer (Mol %)

In order to measure an ethylene concentration Px (mol %) in the propylene-based random copolymer, 20 to 30 mg of a sample was dissolved in 0.6 ml of a 1,2,4-trichlorobenzene/deuterated benzene (2:1) solution, and then, carbon nuclear magnetic resonance analysis ($^{13}$C-NMR) was carried out. Determination of propylene, ethylene and an α-olefin were carried out using a dyad sequence distribution. In the case of, for example, a propylene/ethylene copolymer, they were calculated from the following calculation equations (Eq-7) and (Eq-8) using PP=Sαα, EP=Sαγ+Sαβ and EE=½ (Sβδ+Sδδ)+¼Sγδ.

$$\text{Propylene (mol \%)} = (PP + \tfrac{1}{2}EP) \times 100/(PP + \tfrac{1}{2}EP) + (\tfrac{1}{2}EP + EE) \quad \text{(Eq-7)}$$

$$\text{Ethylene (mol \%)} = (\tfrac{1}{2}EP + EE) \times 100/(PP + \tfrac{1}{2}EP) + (\tfrac{1}{2}EP + EE) \quad \text{(Eq-8)}$$

As for the assignment to the α-olefin, published information, such as Macromolecules 1982, 15, 1150, Macromolecules 1991, 24, 4813 and J. Appl. Polym. Sci., 1991, 42, 399, were referred to.

[m2] Melting Point (Tm)

Melting point was measured using a differential scanning colorimeter (DSC, manufactured by Perkin-Elmer, Inc.). Here, the endothermic peak in the third step was defined as a melting point (Tm).

(Measuring Conditions)

First step: The temperature was raised up to 240° C. at 10° C./min and maintained for 10 minutes.

Second step: The temperature was lowered down to 60° C. at 10° C./min.

Third step: The temperature was raised up to 240° C. at 10° C./min.

[m3] Molecular Weight Distribution (Mw/Mn) [Weight-Average Molecular Weight (Mw), Number-Average Molecular Weight (Mn)]

Measurement was carried out in the following manner using GPC150C Plus manufactured by Waters Corporation. As separation columns, TSKgel GMH6-HT and TSKgel GMH6-HTL were used, and each of them had a column size of an inner diameter of 7.5 mm and a length of 600 mm. The column temperature was set to 140° C. As a mobile phase, o-dichlorobenzene (Wako Pure Chemical Industries, Ltd.) was used, and as an antioxidant, 0.025% by weight of BHT (Wako Pure Chemical Industries, Ltd) was used, and they were moved at 1.0 ml/min. The sample concentration was 0.1% by weight, and the amount of the sample poured was 500 microliters. As a detector, a differential diffractometer was used. As for standard polystyrene, polystyrene manufactured by Tosoh Corporation was used as that of Mw<1000 and that of Mw>4×10$^6$, and polystyrene manufactured by Pressure Chemical Company was used as that of 1000'≤Mw≤4×10$^6$.

[m4] Cross Fractionation Chromatography (CFC)

CFC was carried out under the following conditions using the following apparatus equipped with a temperature rising elution fractionation (TREF) part for performing composition fractionation and a GPC part for performing molecular weight fractionation, and the amount of a component eluted at not higher than 40° C. was calculated.

Measuring apparatus: CFC T-150A type, manufactured by Mitsubishi Petrochemical Co., Ltd., trademark Column: Shodex AT-806MS (3 columns)

Eluting solution: o-dichlorobenzene

Flow rate: 1.0 ml/min

Sample concentration: 0.3 wt/vol % (containing 0.1% BHT)

Pour quantity: 0.5 ml

Solubility: complete dissolution

Detector: infrared absorption detection method, 3.42μ (2924 cm$^{-1}$), NaCl plate Elution temperature: 0 to 135° C., 28 fractions [0, 10, 20, 30, 40, 45, 50, 55, 60, 65, 70, 75, 80, 85, 90, 94, 97, 100, 103, 106, 109, 112, 115, 118, 121, 124, 127, 135° C.]

[m5] Melt Flow Rate (MFR)

Melt flow rate was measured by the method of ASTM D-1238 at 230° C. under a load of 2.16 kg.

[m6] Flexural Modulus

Flexural modulus was measured in accordance with ASTM D-790.

[m7] Tensile Modulus

Tensile modulus was measured in accordance with ASTM D-638.

[m8] Bond Strength

Bond strength was determined by carrying out T-peel under the conditions of a peel ambient temperature of 23° C., a peel rate of 300 mm/min and a peel width of 15 mm.

[a1] Pelletization of Propylene-Based Random Copolymer Particles

To 100 parts by weight of a propylene-based random copolymer, 0.1 part by weight of tetrakis[methylene-3(3,5-di-t-butyl-4-hydroxyphenyl)propionate]methane as an antioxidant, 0.1 part by weight of 2,4-bis(1,1-dimethyl)phosphate phenol, 0.1 part by weight of calcium stearate as a neutralizing agent, 0.15 part by weight of synthetic silica and 0.1 part by weight of erucic acid amide were added, and using a KTX-30 twin-screw extruder, they were melt kneaded at a resin temperature of 250° C., and pelletization of the propylene-based random copolymer was carried out.

Comparative Example 1

(1) Preparation of Modified Polypropylene Composition (S-1)

68% by weight of the propylene-based polymer (A-2-1), 25% by weight of the ethylene/propylene copolymer (B-1) and 7% by weight of the modified propylene homopolymer (C-1) were premixed, and using a single-screw extruder (die diameter: 65 mm, L/D=28), the mixture was melt kneaded at a temperature of 220° C. and then extruded into strands. The strands were cut to prepare pellets, whereby a modified polypropylene composition (S-1) was obtained.

(2) Preparation of Laminated Structure (F-1)

An extrusion molding apparatus in which 3 extruders were combined with one die was used, and to the extruders were respectively fed the propylene-based polymer (A-2-1), the modified polypropylene composition (S-1) obtained in the above (1) and an ethylene/vinyl alcohol copolymer (EVOH) (grade F101A, MFR: 1.6 g/10 min, density: 1190 kg/m$^3$) manufactured by Kuraray Co., Ltd. The highest temperature of each extruder during extrusion was set to 240° C., and co-extrusion molding was carried out through the T-die (die width: 350 mm) of the extrusion molding apparatus at a molding rate of 5 m/min so that a 3-layer structure constituted of propylene-based polymer (A-2-1) (160 μm)/modified polypropylene composition (S-1) (40 μm)/EVOH (40 μm) laminated in this order might be obtained. Thus, a laminated structure (laminate constituted of laminated films) of 3 layers in which the (X) layer was a propylene-based polymer layer, the (Y) layer was a modified polypropylene composition layer, and the (Z) layer was an EVOH layer was prepared.

In order to confirm high-speed moldability, laminated structures of 3 layers having the same constitution as above were prepared at various molding rates. Further, using a batch type biaxial orientation machine, the 3-layer laminated structure produced at a rate of 5 m/min was subjected to simultaneous biaxial orientation to 3 times in the lengthwise and crosswise directions under the conditions of a preheating temperature of 60° C., a preheating time of 30 seconds and an orientation rate of 1.5 m/s, to obtain an oriented laminated structure (F-1).

Comparative Example 2

(1) Preparation of Modified Polypropylene Composition (S-2)

48% by weight of the propylene-based polymer (A-2-1), 20% by weight of the propylene-based polymer (A-1-1), 25% by weight of the ethylene/propylene copolymer (B-1) and 7% by weight of the modified propylene homopolymer (C-1) were premixed, and using a single-screw extruder (die diameter: 65 mm, L/D=28), the mixture was melt kneaded at a temperature of 220° C. and then extruded into strands. The strands were cut to prepare pellets, whereby a modified polypropylene composition (S-2) was obtained.

(2) Preparation of Laminated Structure (F-2)

An extrusion molding apparatus in which 3 extruders were combined with one die was used, and to the extruders were respectively fed the propylene-based polymer (A-2-1), the modified polypropylene composition (S-2) obtained in the above (1) and the aforesaid EVOH. The highest temperature of each extruder during extrusion was set to 240° C., and co-extrusion molding was carried out through the T-die (die width: 350 mm) of the extrusion molding apparatus at a molding rate of 5 m/min so that a 3-layer structure constituted of propylene-based polymer (A-2-1) (160 μm)/modified polypropylene composition (S-2) (40 μm)/EVOH (40 μm) laminated in this order might be obtained. Thus, a laminated structure (laminated films) of 3 layers in which the (X) layer was a propylene-based polymer layer, the (Y) layer was a modified polypropylene composition layer, and the (Z) layer was an EVOH layer was prepared.

In order to confirm high-speed moldability, laminated structures of 3 layers having the same constitution as above were prepared at various molding rates. Further, using a batch type biaxial orientation machine, the 3-layer laminated structure produced at a rate of 5 m/min was subjected to simultaneous biaxial orientation to 3 times in the lengthwise and crosswise directions under the conditions of a preheating temperature of 60° C., a preheating time of 30 seconds and an orientation rate of 1.5 m/s, to obtain an oriented laminated structure (F-2)

Example 1

(1) Preparation of Modified Polypropylene Composition (S-3)

33% by weight of the propylene-based polymer (A-2-1), 35% by weight of the propylene-based polymer (A-1-1), 25% by weight of the ethylene/propylene copolymer (B-1) and 7% by weight of the modified propylene homopolymer (C-1) were premixed, and using a single-screw extruder (die diameter: 65 mm, L/D=28), the mixture was melt kneaded at a temperature of 220° C. and then extruded into strands. The strands were cut to prepare pellets, whereby a modified polypropylene composition (S-3) was obtained.

(2) Preparation of Laminated Structure (F-3)

An extrusion molding apparatus in which 3 extruders were combined with one die was used, and to the extruders were respectively fed the propylene-based polymer (A-2-1), the modified polypropylene composition (S-3) obtained in the above (1) and the aforesaid EVOH. The highest temperature of each extruder during extrusion was set to 240'C, and co-extrusion molding was carried out through the T-die (die width: 350 of the extrusion molding apparatus at a molding rate of 5 m/min so that a 3-layer structure constituted of propylene-based polymer (A-2-1) (160 μm)/modified polypropylene composition (S-3) (40 μm)/EVOH (40 μm) laminated in this order might be obtained. Thus, a laminated structure (laminated films) of 3 layers in which the (X) layer was a propylene-based polymer layer, the (Y)

layer was a modified polypropylene composition layer, and the (Z) layer was an EVOH layer was prepared.

In order to confirm high-speed moldability, laminated structures of 3 layers having the same constitution as above were prepared at various molding rates. Further, using a batch type biaxial orientation machine, the 3-layer laminated structure produced at a rate of 5 m/min was subjected to simultaneous biaxial orientation to 3 times in the lengthwise and crosswise directions under the conditions of a preheating temperature of 60° C., a preheating time of 30 seconds and an orientation rate of 1.5 m/s, to obtain an oriented laminated structure (F-3).

Example 2

(1) Preparation of Modified Polypropylene Composition (S-4)

18% by weight of the propylene-based polymer (A-2-1), 50% by weight of the propylene-based polymer (A-1-1), 25% by weight of the ethylene/propylene copolymer (B-1) and 7% by weight of the modified propylene homopolymer (C-1) were premixed, and using a single-screw extruder (die diameter: 65 mm, L/D=28), the mixture was melt kneaded at a temperature of 220° C. and then extruded into strands. The strands were cut to prepare pellets, whereby a modified polypropylene composition (S-4) was obtained.

(2) Preparation of Laminated Structure (F-4)

An extrusion molding apparatus in which 3 extruders were combined with one die was used, and to the extruders were respectively fed the propylene-based polymer (A-2-1), the modified polypropylene composition (S-4) obtained in the above (1) and the aforesaid EVOH. The highest temperature of each extruder during extrusion was set to 240° C., and co-extrusion molding was carried out through the T-die (die width: 350 mm) of the extrusion molding apparatus at a molding rate of 5 m/min so that a 3-layer structure constituted of propylene-based polymer (A-2-1) (160 µm)/ modified polypropylene composition (S-4) (40 µm)/EVOH (40 µm) laminated in this order might be obtained. Thus, a laminated structure (laminated films) of 3 layers in which the (X) layer was a propylene-based polymer layer, the (Y) layer was a modified polypropylene composition layer, and the (Z) layer was an EVOH layer was prepared.

In order to confirm high-speed moldability, laminated structures of 3 layers having the same constitution as above were prepared at various molding rates. Further, using a batch type biaxial orientation machine, the 3-layer laminated structure produced at a rate of 5 m/min was subjected to simultaneous biaxial orientation to 3 times in the lengthwise and crosswise directions under the conditions of a preheating temperature of 60° C., a preheating time of 30 seconds and an orientation rate of 1.5 m/s, to obtain an oriented laminated structure (F-4).

Example 3

(1) Preparation of Modified Polypropylene Composition (S-5)

68% by weight of the propylene-based polymer (A-1-1), 25% by weight of the ethylene/propylene copolymer (B-1) and 7% by weight of the modified propylene homopolymer (C-1) were premixed, and using a single-screw extruder (die diameter: 65 mm, L/D=28), the mixture was melt kneaded at a temperature of 220° C. and then extruded into strands. The strands were cut to prepare pellets, whereby a modified polypropylene composition (S-5) was obtained.

(2) Preparation of Laminated Structure (F-5)

An extrusion molding apparatus in which 3 extruders were combined with one die was used, and to the extruders were respectively fed the propylene-based polymer (A-2-1), the modified polypropylene composition (S-5) obtained in the above (1) and the aforesaid EVOH. The highest temperature of each extruder during extrusion was set to 240° C., and co-extrusion molding was carried out through the T-die (die width: 350 mm) of the extrusion molding apparatus at a molding rate of 5 m/min so that a 3-layer structure constituted of propylene-based polymer (A-2-1) (160 µm)/ modified polypropylene composition (S-5) (40 µm)/EVOH (40 µm) laminated in this order might be obtained. Thus, a laminated structure (laminated films) of 3 layers in which the (X) layer was a propylene-based polymer layer, the (Y) layer was a modified polypropylene composition layer, and the (Z) layer was an EVOH layer was prepared.

In order to confirm high-speed moldability, laminated structures of 3 layers having the same constitution as above were prepared at various molding rates. Further, using a batch type biaxial orientation machine, the 3-layer laminated structure produced at a rate of 5 m/min was subjected to simultaneous biaxial orientation to 3 times in the lengthwise and crosswise directions under the conditions of a preheating temperature of 60° C., a preheating time of 30 seconds and an orientation rate of 1.5 m/s, to obtain an oriented laminated structure (F-5).

Comparative Example 3

(1) Preparation of Modified Polypropylene Composition (S-6)

88% by weight of the propylene-based polymer (A-1-1), 5% by weight of the ethylene/propylene copolymer (B-1) and 7% by weight of the modified propylene homopolymer (C-1) were premixed, and using a single-screw extruder (die diameter: 65 mm, L/D=28), the mixture was melt kneaded at a temperature of 220° C. and then extruded into strands. The strands were cut to prepare pellets, whereby a modified polypropylene composition (S-6) was obtained.

(2) Preparation of Laminated Structure (F-6)

An extrusion molding apparatus in which 3 extruders were combined with one die was used, and to the extruders were respectively fed the propylene-based polymer (A-2-1), the modified polypropylene composition (S-6) obtained in the above (1) and the aforesaid EVOH. The highest temperature of each extruder during extrusion was set to 240° C., and co-extrusion molding was carried out through the T-die (die width: 350 mm) of the extrusion molding apparatus at a molding rate of 5 m/min so that a 3-layer structure constituted of propylene-based polymer (A-2-1) (160 µm)/ modified polypropylene composition (S-6) (40 µm)/EVOH (40 µm) laminated in this order might be obtained. Thus, a laminated structure (laminated films) of 3 layers in which the (X) layer was a propylene-based polymer layer, the (Y) layer was a modified polypropylene composition layer, and the (Z) layer was an EVOH layer was prepared.

In order to confirm high-speed moldability, laminated structures of 3 layers having the same constitution as above were prepared at various molding rates. Further, using a batch type biaxial orientation machine, the 3-layer laminated structure produced at a rate of 5 m/min was subjected to simultaneous biaxial orientation to 3 times in the lengthwise and crosswise directions under the conditions of a preheating temperature of 60° C., a preheating time of 30 seconds and an orientation rate of 1.5 m/s, to obtain an oriented laminated structure (F-6).

Comparative Example 4

(1) Preparation of Modified Polypropylene Composition (S-7)

48% by weight of the propylene-based polymer (A-2-1), 20% by weight of the propylene-based polymer (A-1-2), 25% by weight of the ethylene/propylene copolymer (B-1) and 7% by weight of the modified propylene homopolymer (C-1) were premixed, and using a single-screw extruder (die diameter: 65 mm, L/D=28), the mixture was melt kneaded at a temperature of 220° C. and then extruded into strands. The strands were cut to prepare pellets, whereby a modified polypropylene composition (S-7) was obtained.

(2) Preparation of Laminated Structure (F-7)

An extrusion molding apparatus in which 3 extruders were combined with one die was used, and to the extruders were respectively fed the propylene-based polymer (A-2-1), the modified polypropylene composition (S-7) obtained in the above (1) and the aforesaid EVOH. The highest temperature of each extruder during extrusion was set to 240° C., and co-extrusion molding was carried out through the T-die (die width: 350 mm) of the extrusion molding apparatus at a molding rate of 5 m/min so that a 3-layer structure constituted of propylene-based polymer (A-2-1) (160 μm)/ modified polypropylene composition (S-7) (40 μm)/EVOH (40 μm) laminated in this order might be obtained. Thus, a laminated structure (laminated films) of 3 layers in which the (X) layer was a propylene-based polymer layer, the (Y) layer was a modified polypropylene composition layer, and the (Z) layer was an EVOH layer was prepared.

In order to confirm high-speed moldability, laminated structures of 3 layers having the same constitution as above were prepared at various molding rates. Further, using a batch type biaxial orientation machine, the 3-layer laminated structure produced at a rate of 5 m/min was subjected to simultaneous biaxial orientation to 3 times in the lengthwise and crosswise directions under the conditions of a preheating temperature of 60° C., a preheating time of 30 seconds and an orientation rate of 1.5 m/s, to obtain an oriented laminated structure (F-7).

Example 4

(1) Preparation of Modified Polypropylene Composition (S-8)

33% by weight of the propylene-based polymer (A-2-1), 35% by weight of the propylene-based polymer (A-1-2), 25% by weight of the ethylene/propylene copolymer (B-1) and 7% by weight of the modified propylene homopolymer (C-1) were premixed, and using a single-screw extruder (die diameter: 65 mm, L/D=28), the mixture was melt kneaded at a temperature of 220° C. and then extruded into strands. The strands were cut to prepare pellets, whereby a modified polypropylene composition (S-8) was obtained.

(2) Preparation of Laminated Structure (F-8)

An extrusion molding apparatus in which 3 extruders were combined with one die was used, and to the extruders were respectively fed the propylene-based polymer (A-2-1), the modified polypropylene composition (S-8) obtained in the above (1) and the aforesaid EVOH. The highest temperature of each extruder during extrusion was set to 240° C., and co-extrusion molding was carried out through the T-die (die width: 350 mm) of the extrusion molding apparatus at a molding rate of 5 m/min so that a 3-layer structure constituted of propylene-based polymer (A-2-1) (160 μm)/ modified polypropylene composition (S-8) (40 μm)/EVOH (40 μm) laminated in this order might be obtained. Thus, a laminated structure (laminated films) of 3 layers in which the (X) layer was a propylene-based polymer layer, the (Y) layer was a modified polypropylene composition layer, and the (Z) layer was an EVOH layer was prepared.

In order to confirm high-speed moldability, laminated structures of 3 layers having the same constitution as above were prepared at various molding rates. Further, using a batch type biaxial orientation machine, the 3-layer laminated structure produced at a rate of 5 m/min was subjected to simultaneous biaxial orientation to 3 times in the lengthwise and crosswise directions under the conditions of a preheating temperature of 60° C., a preheating time of 30 seconds and an orientation rate of 1.5 m/s, to obtain an oriented laminated structure (F-8).

Example 5

(1) Preparation of Modified Polypropylene Composition (S-9)

18% by weight of the propylene-based polymer (A-2-1), 50% by weight of the propylene-based polymer (A-1-2), 25% by weight of the ethylene/propylene copolymer (B-1) and 7% by weight of the modified propylene homopolymer (C-1) were premixed, and using a single-screw extruder (die diameter: 65 mm, L/D=28), the mixture was melt kneaded at a temperature of 220° C. and then extruded into strands. The strands were cut to prepare pellets, whereby a modified polypropylene composition (S-9) was obtained.

(2) Preparation of Laminated Structure (F-9)

An extrusion molding apparatus in which 3 extruders were combined with one die was used, and to the extruders were respectively fed the propylene-based polymer (A-2-1), the modified polypropylene composition (S-9) obtained in the above (1) and the aforesaid EVOH. The highest temperature of each extruder during extrusion was set to 240° C., and co-extrusion molding was carried out through the T-die (die width: 350 mm) of the extrusion molding apparatus at a molding rate of 5 m/min so that a 3-layer structure constituted of propylene-based polymer (A-2-1) (160 μm)/ modified polypropylene composition (S-9) (40 μm)/EVOH (40 μm) laminated in this order might be obtained. Thus, a laminated structure (laminated films) of 3 layers in which the (X) layer was a propylene-based polymer layer, the (Y) layer was a modified polypropylene composition layer, and the (Z) layer was an EVOH layer was prepared.

In order to confirm high-speed moldability, laminated structures of 3 layers having the same constitution as above were prepared at various molding rates. Further, using a batch type biaxial orientation machine, the 3-layer laminated structure produced at a rate of 5 m/min was subjected to simultaneous biaxial orientation to 3 times in the lengthwise and crosswise directions under the conditions of a preheating temperature of 60° C., a preheating time of 30 seconds and an orientation rate of 1.5 m/s, to obtain an oriented laminated structure (F-9).

Example 6

(1) Preparation of Modified Polypropylene Composition (S-10)

68% by weight of the propylene-based polymer (A-1-2), 25% by weight of the ethylene/propylene copolymer (B-1) and 7% by weight of the modified propylene homopolymer (C-1) were premixed, and using a single-screw extruder (die diameter: 65 mm, L/D=28), the mixture was melt kneaded at a temperature of 220° C. and then extruded into strands. The strands were cut to prepare pellets, whereby a modified polypropylene composition (S-10) was obtained.

(2) Preparation of Laminated Structure (F-10)

An extrusion molding apparatus in which 3 extruders were combined with one die was used, and to the extruders were respectively fed the propylene-based polymer (A-2-1), the modified polypropylene composition (S-10) obtained in the above (1) and the aforesaid EVOH. The highest temperature of each extruder during extrusion was set to 240° C., and co-extrusion molding was carried out through the T-die (die width: 350 mm) of the extrusion molding apparatus at a molding rate of 5 m/min so that a 3-layer structure constituted of propylene-based polymer (A-2-1) (160 μm)/ modified polypropylene composition (S-10) (40 μm)/EVOH (40 μm) laminated in this order might be obtained. Thus, a laminated structure (laminated films) of 3 layers in which the (X) layer was a propylene-based polymer layer, the (Y) layer was a modified polypropylene composition layer, and the (Z) layer was an EVOH layer was prepared.

In order to confirm high-speed moldability, laminated structures of 3 layers having the same constitution as above were prepared at various molding rates. Further, using a batch type biaxial orientation machine, the 3-layer laminated structure produced at a rate of 5 m/min was subjected to simultaneous biaxial orientation to 3 times in the lengthwise and crosswise directions under the conditions of a preheating temperature of 60° C., a preheating time of 30 seconds and an orientation rate of 1.5 m/s, to obtain an oriented laminated structure (F-10).

Comparative Example 5

(1) Preparation of Modified Polypropylene Composition (S-11)

88% by weight of the propylene-based polymer (A-1-2), 5% by weight of the ethylene/propylene copolymer (B-1) and 7% by weight of the modified propylene homopolymer (C-1) were premixed, and using a single-screw extruder (die diameter: 65 mm, L/D-28), the mixture was melt kneaded at a temperature of 220° C. and then extruded into strands. The strands were cut to prepare pellets, whereby a modified polypropylene composition (S-11) was obtained.

(2) Preparation of Laminated Structure (F-11)

An extrusion molding apparatus in which 3 extruders were combined with one die was used, and to the extruders were respectively fed the propylene-based polymer (A-2-1), the modified polypropylene composition (S-11) obtained in the above (1) and the aforesaid EVOH. The highest temperature of each extruder during extrusion was set to 240° C., and co-extrusion molding was carried out through the T-die (die width: 350 mm) of the extrusion molding apparatus at a molding rate of 5 m/min so that a 3-layer structure constituted of propylene-based polymer (A-2-1) (160 μm)/ modified polypropylene composition (S-11) (40 μm)/EVOH (40 μm) laminated in this order might be obtained. Thus, a laminated structure (laminated films) of 3 layers in which the (X) layer was a propylene-based polymer layer, the (Y) layer was a modified polypropylene composition layer, and the (Z) layer was an EVOH layer was prepared.

In order to confirm high-speed moldability, laminated structures of 3 layers having the same constitution as above were prepared at various molding rates. Further, using a batch type biaxial orientation machine, the 3-layer laminated structure produced at a rate of 5 m/min was subjected to simultaneous biaxial orientation to 3 times in the lengthwise and crosswise directions under the conditions of a preheating temperature of 60° C., a preheating time of 30 seconds and an orientation rate of 1.5 m/s, to obtain an oriented laminated structure (F-11).

Comparative Example 6

(1) Preparation of Modified Polypropylene Composition (S-12)

68% by weight of the propylene-based polymer (E-1), 25% by weight of the ethylene/propylene copolymer (B-1) and 7% by weight of the modified propylene homopolymer (C-1) were premixed, and using a single-screw extruder (die diameter: 65 mm, L/D=28), the mixture was melt kneaded at a temperature of 220° C. and then extruded into strands. The strands were cut to prepare pellets, whereby a modified polypropylene composition (S-12) was obtained.

(2) Preparation of Laminated Structure (F-12)

An extrusion molding apparatus in which 3 extruders were combined with one die was used, and to the extruders were respectively fed the propylene-based polymer (A-2-1), the modified polypropylene composition (S-12) obtained in the above (1) and the aforesaid EVOH. The highest temperature of each extruder during extrusion was set to 240° C., and co-extrusion molding was carried out through the T-die (die width: 350 mm) of the extrusion molding apparatus at a molding rate of 5 m/min so that a 3-layer structure constituted of propylene-based polymer (A-2-1) (160 μm)/ modified polypropylene composition (S-12) (40 μm)/EVOH (40 μm) laminated in this order might be obtained. Thus, a laminated structure (laminated films) of 3 layers in which the (X) layer was a propylene-based polymer layer, the (Y) layer was a modified polypropylene composition layer, and the (Z) layer was an EVOH layer was prepared.

In order to confirm high-speed moldability, laminated structures of 3 layers having the same constitution as above were prepared at various molding rates. Further, using a batch type biaxial orientation machine, the 3-layer laminated structure produced at a rate of 5 m/min was subjected to simultaneous biaxial orientation to 3 times in the lengthwise and crosswise directions under the conditions of a preheating temperature of 60° C., a preheating time of 30 seconds and an orientation rate of 1.5 m/s, to obtain an oriented laminated structure (F-12).

As for the laminated structures (F-1) to (F-12) obtained above, the interlaminar bond strength between the (Y) layer and the (Z) layer prepared at each of various molding rates was measured. The results are set forth in Table 2-1 and Table 2-2. Various molding rates and thicknesses of the layers are as follows.

(X)/(Y)/(Z)=160/40/40 (μm) at 5 m/min (measurement of bond strength before and after orientation)
(X)/(Y)/(Z)=40/10/20 (μm) at 20 m/min
(X)/(Y)/(Z)=20/5/10 (μm) at 40 m/min
(X)/(Y)/(Z)=10/2.5/5 (μm) at 80 m/min

TABLE 2-1

| Composition | Comp. Ex. 1 (S-1) | Comp. Ex. 2 (S-2) | Ex. 1 (S-3) | Ex. 2 (S-4) | Ex. 3 (S-5) | Comp. Ex. 3 (S-6) |
|---|---|---|---|---|---|---|
| Propylene-based polymer (A-2-1) | 68 wt % | 48 wt % | 33 wt % | 18 wt % | | |
| Propylene-based polymer (A-1-1) | | 20 wt % | 35 wt % | 50 wt % | 68 wt % | 88 wt % |
| Ethylene/propylene copolymer (B-1) | 25 wt % | 25 wt % | 25 wt % | 25 wt % | 25 wt % | 5 wt % |
| Modified propylene homopolymer (C-1) | 7 wt % | 7 wt % | 7 wt % | 7 wt % | 7 wt % | 7 wt % |
| Bond strength Molding rate: 5 m/min Before orientation N/15 mm | 18.3 | 20.2 | 20.8 | 19 | 19.5 | 10 |
| Bond strength Molding rate: 5 m/min After 3 × 3 times-orientation N/15 mm | 0.2 | 0.2 | 0.6 | 0.8 | 1 | 0.1 |
| Bond strength Molding rate: 20 m/min N/15 mm | 2.7 | 3.2 | 4.3 | 5.5 | 6 | 1.9 |
| Bond strength Molding rate: 40 m/min N/15 mm | 1 | 0.9 | 1.9 | 3.1 | 3.8 | 0.2 |
| Bond strength Molding rate: 80 m/min N/15 mm | 0.5 | 0.5 | 0.9 | 1.2 | 1 | 0.4 |

TABLE 2-2

| Composition | Comp. Ex. 4 (S-7) | Ex. 4 (S-8) | Ex. 5 (S-9) | Ex. 6 (S-10) | Comp. Ex. 5 (S-11) | Comp. Ex. 6 (S-12) |
|---|---|---|---|---|---|---|
| Propylene-based polymer (A-2-1) | 48 wt % | 33 wt % | 18 wt % | | | |
| Propylene-based polymer (A-1-2) | 20 wt % | 35 wt % | 50 wt % | 68 wt % | 88 wt % | |
| Propylene-based polymer (E-1) | | | | | | 68 wt % |
| Ethylene/propylene copolymer (B-1) | 25 wt % | 25 wt % | 25 wt % | 25 wt % | 5 wt % | 25 wt % |
| Modified propylene homopolymer (C-1) | 7 wt % | 7 wt % | 7 wt % | 7 wt % | 7 wt % | 7 wt % |
| Bond strength Molding rate: 5 m/min Before orientation N/15 mm | 20.3 | 22.6 | 20.3 | 20 | 8.6 | 19.2 |
| Bond strength Molding rate: 5 m/min After 3 × 3 times-orientation N/15 mm | 0.2 | 0.9 | 1.1 | 1.6 | 0.2 | 0.4 |
| Bond strength Molding rate: 20 m/min N/15 mm | 3.6 | 6.3 | 8 | 9 | 2.3 | 3.1 |
| Bond strength Molding rate: 40 m/min N/15 mm | 1.3 | 4.4 | 4.1 | 4.2 | 1.1 | 1.3 |
| Bond strength Molding rate: 80 m/min N/15 mm | 0.5 | 2.5 | 2.3 | 2.7 | 0.6 | 1 |

The invention claimed is:

1. A modified polypropylene composition comprising
   60 to 85% by weight of an isotactic propylene-based polymer (A-1),
   10 to 30% by weight of an ethylene/α-olefin copolymer (B) having a melt flow rate (MFR; ASTM D1238, 230° C., load of 2.16 kg) of 0.01 to 40 g/10 min, a density (ASTM D1505) of not more than 0.900 g/cm$^3$ and containing constituent units derived from ethylene in an amount of 55 to 95% by weight, and
   0.01 to 10% by weight of modified polypropylene (C) all of which has been graft-modified with an unsaturated carboxylic acid or a derivative thereof [(A-1)+(B)+(C)=100% by weight],
   wherein the propylene-based polymer (A-1) has the following properties:
   [1] MFR (230° C., load of 2.16 kg) is 1 to 50 (g/10 min),
   [2] the elution peak temperature based on TREF is not higher than 75° C., and the elution integrated value at 20° C. is less than 0.1% by weight, as measured by using o-dichlorobenzene as an eluent, and
   [3] the melting point, as determined by DSC, is not higher than 135° C.

2. The modified polypropylene composition as claimed in claim 1,
   wherein the propylene-based polymer (A-1) is a copolymer obtained by copolymerizing propylene and an α-olefin selected from the group consisting of ethylene, 1-butene, 1-pentene, 1-hexene, 4-methyl-1-pentene and 1-octene in the presence of a metallocene catalyst.

3. The modified polypropylene composition as claimed in claim 1,
   wherein the melt flow rate (MFR; ASTM D1238, 230° C., load of 2.16 kg) of the propylene-based polymer (A-1) is 2 to 6 g/10 min.

4. A laminate comprising a 2-layer or 3-layer structure consisting of a composition layer composed of the modified polypropylene composition as claimed in claim 1 and a resin layer or resin layers provided on one surface or both surfaces of the composition layer.

5. The laminate as claimed in claim 4,
   wherein the resin layer contains a layer composed of a polymer containing at least a monomer having a polar group.

6. A laminate comprising a layer (Z) composed of an ethylene/vinyl alcohol copolymer, a layer (Y) composed of the modified polypropylene composition as claimed in claim 1 and a layer (X) composed of unmodified polypropylene, said layers being laminated in this order.

7. A modified polypropylene composition comprising
   25 to 85% by weight of an isotactic propylene-based polymer (A-1),
   0 to 45% by weight of a propylene-based polymer (A-2),
   10 to 30% by weight of an ethylene/α-olefin copolymer (B) having a melt flow rate (MFR; ASTM D1238, 230° C., load of 2.16 kg) of 0.01 to 40 g/10 min, a density (ASTM D1505) of not more than 0.900 g/cm$^3$ and containing constituent units derived from ethylene in an amount of 55 to 95% by weight, and
   0.01 to 10% by weight of modified polypropylene (C) all of which has been graft-modified with an unsaturated carboxylic acid or a derivative thereof [(A-1)+(A-2)+(B)+(C)=100% by weight],
   wherein the propylene-based polymer (A-1) has the following properties:
   [1] MFR (230° C., load of 2.16 kg) is 1 to 50 (g/10 min),
   [2] the elution peak temperature based on TREF is not higher than 75° C., and the elution integrated value at 20° C. is less than 0.1% by weight, as measured by using o-dichlorobenzene as an eluent, and
   [3] the melting point, as determined by DSC, is not higher than 135° C., and
   the propylene-based polymer (A-2) has an elution peak temperature based on TREF of higher than 75° C.

8. The modified polypropylene composition as claimed in claim 7,
   wherein the propylene-based polymer (A-1) is a copolymer obtained by copolymerizing propylene and an α-olefin selected from the group consisting of ethylene, 1-butene, 1-pentene, 1-hexene, 4-methyl-1-pentene and 1-octene in the presence of a metallocene catalyst.

9. The modified polypropylene composition as claimed in claim 7,
   wherein the melt flow rate (MFR; ASTM D1238, 230° C., load of 2.16 kg) of the propylene-based polymer (A-1) is 2 to 6 g/10 min.

10. A laminate comprising a 2-layer or 3-layer structure consisting of a composition layer composed of the modified polypropylene composition as claimed in claim 7 and a resin layer or resin layers provided on one surface or both surfaces of the composition layer.

11. The laminate as claimed in claim 10,
    wherein the resin layer contains a layer composed of a polymer containing at least a monomer having a polar group.

12. A laminate comprising a layer (Z) composed of an ethylene/vinyl alcohol copolymer, a layer (Y) composed of the modified polypropylene composition as claimed in claim 7 and a layer (X) composed of unmodified polypropylene, said layers being laminated in this order.

* * * * *